Dec. 29, 1931.   D. B. THORNTON   1,838,594
POWER TRANSMISSION MECHANISM
Filed July 21, 1928
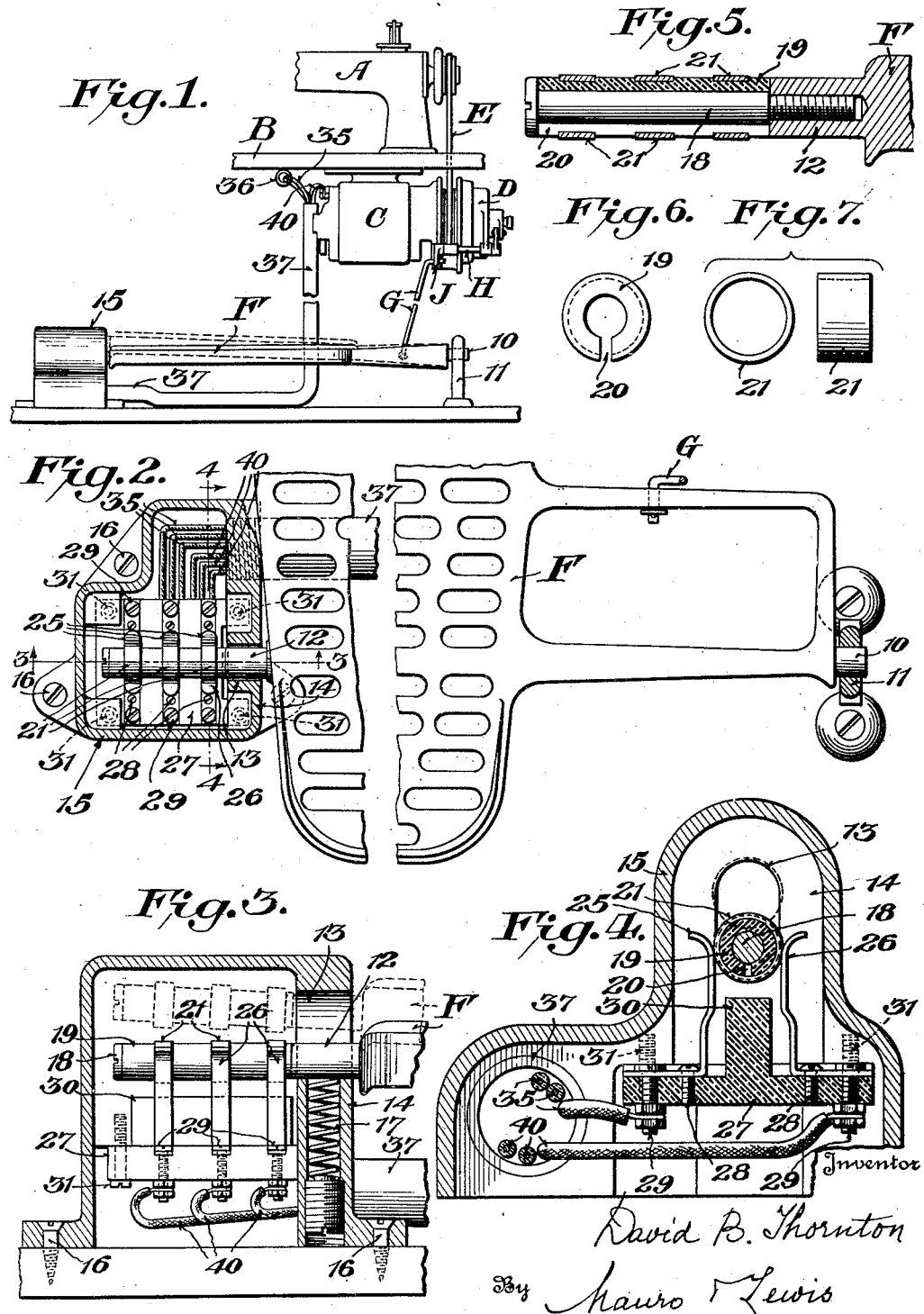
Inventor
David B. Thornton
By Mauro & Lewis
Attorney Patented Dec. 29, 1931

1,838,594

UNITED STATES PATENT OFFICE

DAVID B. THORNTON, OF FLUSHING, NEW YORK, ASSIGNOR TO WILLCOX & GIBBS SEWING MACHINE COMPANY, OF NEW YORK, N. Y., A CORPORATION OF NEW YORK

POWER TRANSMISSION MECHANISM

Application filed July 21, 1928. Serial No. 294,494.

This invention relates to machanism for transmitting power from an electric motor and more specifically to an automatic switch designed and intended for use in conjunction with individual motor transmitters such as employed for driving sewing machines. The invention is applicable, however, to other uses.

In the operation of sewing machines in mills or factories and elsewhere it has long been the practice to transmit driving power to the machine by means of a treadle controlled friction clutch power transmitter individual to each machine and whereby the speed at which the machine is driven may be varied by movement of the treadle to vary correspondingly the force by which the driving and driven elements of the clutch are pressed together. It has become the practice also to employ an electric motor individual to each machine for supplying the power to drive the driving element of the treadle controlled friction clutch power transmitter individual to the machine and to combine the motor and transmitter for each machine into an unitary structure known as an individual motor transmitter. To enable the operator to turn the current to the motor of her machine on or off, an electric switch (usually of the turn button type) has been provided in association with each machine and usually mounted on the bench of the machine within easy reach of the operator. But that arrangement is unsatisfactory and objectionable, principally for the reason that it inevitably happens that the current is frequently needlessly left turned on and the motor running with resulting useless consumption and waste of current and wear and tear upon the motor and parts actuated thereby. With that condition in view it has been proposed to actuate a switch in the motor circuit by means of the connections by which the treadle controls the friction clutch, whereby the same movement of the treadle will first close the switch and then bring the clutch into action. But that arrangement has not come into use, so far as known, and is objectionable and unsatisfactry and believed to be impracticable principally for the reason that the same kind or character of movement of the treadle which controls the friction clutch and the speed at which it drives the machine also opens and closes the switch in the motor circuit, so that the operator would have to be unduly exact in releasing the treadle to ease off or throw out the clutch while at the same time avoiding premature or inopportune opening of the motor circuit switch. It is frequently desirable to stop and start the machine by means of the clutch without stopping the motor; and obviously it would be highly objectionable and impracticable, for many reasons, to turn the current to the motor on and off every time the machine is stopped and started.

One object of this invention is to provide a switch in the motor circuit of an organization such as above specified which will overcome the objections to the switches heretofore employed or proposed for such use.

Another object is to provide a motor switch which shall be actuated by a movement of the treadle of a kind or character distinct and different from the movement of the treadle which controls the friction clutch of the power transmitter. In other words, it being very desirable that the operation of the motor switch should be effected by the operator's foot, and preferably through the same treadle that controls the friction clutch,—this object is so to construct the treadle as to give it two distinct movements, both under control of the operator's foot, one of such movements operating the clutch mechanism and the other the motor switch. One of said movements is preferably the usual oscillatory or rocking movement of the treadle on its axis, and the other is preferably a bodily displacement of the treadle such as to change the position of its axis of oscillation; though this feature of the invention is susceptible of various mechanical embodiments.

Another object is to provide a power control mechanism of the type indicated so constructed that, whatever the position of the treadle in the ordinary rocking movement, the motor will always be in circuit so long as the operator's foot is on the treadle; and to insure that whenever the operator's foot is removed from the treadle the motor will be automatically stopped. In other words, this object is to provide means for automatically closing or opening the motor circuit by the act of the operator in placing her foot upon or removing it from the treadle.

Still other objects will be apparent from the detailed description and drawings.

The aforesaid and other objects and advantages are realized by the present invention, as will be more fully understood by reference to the accompanying drawings illustrating what is regarded at present as the preferred mechanical embodiment thereof. In said drawings—

Fig. 1 shows in elevation part of a sewing machine and the treadle-mechanism and combined electric motor and friction clutch power transmitter which are individual to said sewing machine and which control the operation thereof;

Fig. 2 is a top plan view (on a larger scale than Fig. 1), partly in section, showing the treadle and its mounting;

Fig. 3 is a detail in vertical section on line 3—3 of Fig. 2 (on a still larger scale) showing particularly the electric switch at one end of the treadle mechanism;

Fig. 4 is a vertical cross-section on line 4—4 of Fig. 2 (on a still larger scale);

Fig. 5 is a detail longitudinal sectional view through the stud which projects from one end of the treadle and showing in particular the parts of the electric switch which are carried by said stud;

Figs. 6 and 7 are detail views of said switch parts.

Referring to Fig. 1—A designates part of a sewing machine mounted upon a bench or table, beneath which there is mounted or suspended a combined electric motor and friction clutch power transmitter unit, comprising motor C and transmitter D, the latter being of the well known friction clutch type. A belt E drives the sewing machine A from the driven member of the friction clutch. F is a treadle and G is a rod or link connecting the treadle to parts which control the engagement and disengagement of driving and driven elements of the transmitter, said parts including a rock shaft H, an arm J on said shaft to which said rod G connects, and a spring (not shown) which normally holds and returns the parts to position for disengagement of the clutch members and which spring, through the rod G, resists the rocking movement of the treadle when the same is depressed by the foot of the operator to render the clutch active. When the treadle is rocked forward by the operator's foot, the clutch will be brought into action to drive the sewing machine, the speed at which it is driven being controlled by the degree of rocking of the treadle, all as well understood and according to common practice.

The parts thus identified and described by use of reference letters may be of well known standard construction, except as hereinafter specified in reference to the treadle F.

The treadle F is supported in bearings so as to be capable of the usual rocking movement on its axis through an arc of sufficient amplitude for the operation of the friction clutch power transmitter D. For that purpose the treadle has at one side or end thereof a pivot pin or stud 10, journaled in a bearing carried by an upright support 11 screwed to the floor; and at its other side or end the treadle has a short shaft, arbor, or stud 12, the axis of which coincides with that of stud 10. The short arbor 12 projects through a vertically elongated opening or slot 13 through the right hand side wall 14, of a housing 15 and is adapted to rotate in the bearing constituted by the bottom semi-circular wall of said opening, as shown in Figs. 2 and 3. The housing 15 is secured to the floor by screws 16. Thus the ordinary rocking movement of the treadle is provided for.

In addition, however, to that ordinary rocking movement, the treadle is so constructed and mounted as to be capable of another movement of a different character, and independent of the usual rocking movement described above. In that particular embodiment of the invention which is illustrated in the drawings, this additional movement is a tilting movement upon an axis at right angles to the axis proper of the treadle. In other words, the treadle is so mounted that it is capable of tilting at one end, as indicated in Figs. 1 and 3 by the full line and dotted line positions respectively of the treadle. It is by this movement of the treadle that the circuit connections of motor C are made and broken, as will now be described. The bearing of the pivot stud 10 is such as to give the freedom necessary to permit this endwise tilting motion of the treadle.

Wall 14 of housing 15 has a vertical tubular cavity as shown in Fig. 3, containing a coiled spring 17, which bears upwardly against arbor 12. Spring 17 is put under compression when the operator's foot is placed upon the treadle and arbor 12 is thereby pressed down to its bearing at the bottom of the opening 13, the arbor being then in a horizontal position as shown in full line in Fig. 3. When the operator's foot is removed, and the treadle thereby relieved of the weight of her foot and leg, the pressure of spring 17 lifts the left hand end of the treadle into the position indicated in dotted lines Figs. 1 and 3. This tilting movement, which is limited by the arbor 12 engaging the upper and lower ends of slot 13, is utilized for making and breaking the circuit connections of motor C, and preferably in the following manner.

Arbor 12 has a prolongation which constitutes the movable member of an electric switch, and to that end its construction may with advantage be that illustrated in detail in Figs. 5, 6 and 7. As there shown, the prolongation is constituted by a stem 18 passing through a tubular sleeve 19 of suitable insulating material, such as bakelite, said sleeve being longitudinally split from end to end along one side thereof as indicated at 20. Stem 18 has a screw head at its outer end and at its inner end a screw threaded section which engages a screw threaded axial socket in arbor 12. Three copper contact rings 21, 21, 21 fit in spaced grooves respectively around the insulation sleeve 19. In assembling these parts, the insulation sleeve 19 (Fig. 6) is contracted to an extent permitted by the split 20; the copper rings 21 are then slipped onto said sleeve to positions to engage in their respective grooves; the sleeve is then allowed to expand to its normal dimensions and the stem 18 is then inserted through the sleeve and the screw threaded end thereof engaged with the screw threaded socket of the arbor 12.

Current for driving the motor may be supplied by any suitable form of power circuit, that illustrated being of the three conductor type and hence requiring three pairs of upstanding contact springs 25, 26, for cooperation with the three contact rings 21 respectively. Said contact springs are mounted on a base or block 27 of suitable insulating material, such as bakelite. As most clearly shown in Fig. 4, each spring 25, 26, has a right angle extension or foot at its lower end fitting in a groove in the upper face of block 27 and secured therein by a screw 28 and a screw headed bolt 29 the lower end of which carries two nuts and constitutes a binding post for a circuit conductor. An upstanding wall or extension 30 along the middle of block 27 is positioned between the spring contacts 25, 26, of the three pairs and serves to better insulate said contacts from each other and to limit their movement toward each other when the contact rings 21 are elevated out of engagement with said spring contacts. The block 27, at each of the four corners thereof, fits upwardly against an overhanging seat on the housing 15 and is secured by a screw 31 threaded into a socket in each seat.

Three power line conductors 35 pass from a conduit 36 under the bench B (Fig. 1) into the upstanding end of a conduit 37 which, at its other end, taps into a screw threaded opening through the wall 14 of the housing 15 (see Fig. 2). Entering said housing through said conduit, the three conductors 35 are connected to the three binding posts 29 respectively of the three spring contacts 25. Three conductors 40, connected to the binding posts 29 respectively of the three spring contacts 26, lead through conduit 37 (Figs. 2, 3 and 4) and from the upper end thereof to the motor C (Fig. 1). As thus appears, each conductor 35 leads to a contact spring 25, and from the corresponding contact spring 26 (of the pair) a conductor 40 leads to the motor. When the three copper rings 21 are engaged between the spring contacts of the respective pairs 25, 26 the circuit of each conductor 35 is completed to the motor; but when said rings 21 are lifted out of engagement with the spring contacts the circuit from each of the three conductors 35 is broken between its corresponding pair of contacts 25, 26. The copper rings 21 thus constitute the movable member of the switch.

In operation, when the operator places her foot upon the treadle F, the weight of her foot and leg automatically moves or depresses the treadle against the pressure of spring 17, from the dotted line position to the full line position thereof as illustrated in Figs. 1 and 3, thereby engaging the contact rings 21 between their respective pairs of contact springs 25, 26, closing the circuit to the motor and causing it to operate. Thus the motor will be always in circuit and operating so long as the operator's foot is on the treadle and regardless of the tilt of the latter about its axis of rotation. But on the other hand, the moment the operator removes her foot from the treadle, the spring 17 acts to elevate the treadle at its left-hand end to the position indicated in dotted lines in Figs. 1 and 3, thereby elevating the copper rings 21 out of engagement with their corresponding pairs of spring contacts and breaking the circuit from each of the conductors 35 to the motor F. When the treadle is in its depressed position, with the motor running, the operator may impart to it any degree of rocking movement on its axis that may be necessary to give the desired control of the clutch; and she may so rock the treadle without fear of thereby prematurely or inopportunely opening the motor circuit and stopping the motor.

It will be seen that the construction disclosed not only prevents the inadvertent disconnection of the motor, but also makes it impossible for the operator to leave her post without disconnecting the motor.

What is claimed:

1. In combination with a machine and a motor for driving the same, a power-transmission mechanism comprising a clutch for connecting said machine and motor, an operating treadle having axial movements on axes at a substantial angle to each other respectively, switching means for connecting said motor with a source of power, connections between said treadle and said clutch and other connections between said treadle and said switching means, whereby one movement of the treadle operates the former and the other movement thereof operates the latter.

2. In combination with a machine and a motor for driving the same, clutch mechanism for coupling the two together, and switching means for putting said motor into and out of connection with a source of power, a treadle mounted to rock axially in bearings and to have also an endwise tilting motion, connections whereby the axial movements of said treadle are communicated to said clutch mechanism, and other connections whereby the endwise tilting movements thereof are communicated to said switching means.

3. In a power-transmission apparatus and in combination with a machine and an electric motor for driving it, and with clutch mechanism for coupling said machine and motor, an electric switch for putting the motor into and out of a power circuit, an operating treadle journaled in bearings so as to have the usual axial movement, the treadle shaft being held in its bearing at one end by the weight of the operator's foot against the pressure of a spring capable of lifting the treadle when the operator's foot is removed, connections between said shaft and the movable member of said electric switch, and other connections for transmitting the axial movement of said treadle shaft to said clutch mechanism.

4. In an individual motor-drive for sewing and other machines, comprising an electric motor, clutch mechanism for coupling the motor and the machine driven thereby, and an electric switch, a treadle for operating said clutch mechanism and said switch, said treadle being mounted in bearings so as to rock axially therein, and so as to be held in one of its bearings against spring pressure by the operator's foot, and connections whereby the axial movements of the treadle are communicated to said clutch mechanism, and its bodily movements into and away from one of its bearings are communicated to said electric switch.

5. In an individual motor-drive for sewing and other machines, comprising an electric motor, clutch mechanism for coupling the motor and the machine driven thereby, and a switch for opening and closing the motor circuits, an operating treadle supported to rock axially in its bearings, and also to tilt endwise into and out of one of its bearings, a spring for pressing the treadle away from its last-named bearing, and electrical contacts movable with said treadle and forming part of said switch.

6. The combination of a power transmitter; mechanism adapted to be driven by said power-transmitter; a source of power for driving said power transmitter; and a device having two kinds of movement about axes at a substantial angle to each other respectively adapted to be imparted thereto by an operator, one of which renders said power transmitter active or inactive with respect to said mechanism, and the other of which renders said source of power active or inactive with respect to said power transmitter.

7. The combination of a power transmitter; mechanism adapted to be driven by said power transmitter; and a treadle having two kinds of movement about axes at a substantial angle to each other respectively adapted to be imparted thereto by the foot of an operator, one of which is produced by the application of the operator's foot to and its removal from the treadle and renders said source of power active or inactive with respect to said power transmitter, and the other of which renders said power transmitter active or inactive with respect to said mechanism.

8. The combination of an electric motor; an electric switch for turning the current to said motor on and off; a clutch for connecting the motor to mechanism to be driven thereby; and a treadle having two kinds of movement about axes at a substantial angle to each other respectively, one for effecting the operation of said switch and the other for controlling the operation of said clutch.

In testimony whereof I have signed this specification.

DAVID B. THORNTON.